3,445,232
PHOTOGRAPHY

John E. Shirey, Wickliffe, Ohio, assignor to Horizons Research Incorporated, a corporation of Ohio No Drawing. Filed Oct. 21, 1965, Ser. No. 500,321
Int. Cl. G03c 1/72
U.S. Cl. 96—90 16 Claims

ABSTRACT OF THE DISCLOSURE

The addition of an acid anhydride or a polymer of same, or an aromatic ether to a latent image non-silver photosensitive composition to stabilize said composition against infrared radiation.

This invention relates to photosensitive films and to the compositions thereof. More particularly, it relates to compositions and films from which visible images are obtained by totally dry procedures.

When photographically exposed the photosensitive compositions of this invention form a latent image in the exposed areas, which image is developed into a visible image by exposure of the latent image bearing film to radiation in the long infrared portion of the spectrum and the developed image is fixed by exposure of the film to dark heat.

The films of this invention are particularly useful for the projection and enlargement of microfilm subjects and for flexographic copy processes.

The compositions of the invention comprise at least one of each of the following constituents:

(1) A leuco compound
(2) A volatile organic halogen compound
(3) A suitable carbonyl compound
(4) A triaryl compound of a group V element
(5) A suitable binder
(6) A compound which appears to function as an infrared stabilizer

(1) Leuco compound

Leuco compounds suitable for the compositions of this invention include Leuco Crystal Violet, Leuco Opal Blue, Leuco Malachite Green, Leuco Xanthenes, Leuco Anthracenes and numerous other leuco compounds of similar structure usually having a central carbon atom to which two or three aryl groups are attached as in the di- and triaryl methane derivatives, or which forms a portion of a heterocyclic ring in a fused ring compound such as the xanthenes, thioxanthenes, acridines, anthracenes and the like.

Within the context of the term "leuco compound" is included the alkyl and allyl ethers of the compounds given in the preceding paragraph.

The term "ether" means a substitution of an oxy group for the hydrogen atom attached to the central carbon atom of the leuco compounds described above. Such substitutions would include methoxy, ethoxy, allyloxy and their analogs and homologs. These ethers may be used as additives or substitutes for the leuco compounds given in the above paragraphs.

A non-amino triphenyl compound in its ether form such as triphenylmethoxymethane may be used as an additive to any of the above to give a blacker image and better contrast in less time. Strictly speaking this may not be a leuco compound but exhibits the same nucleus configuration as the leuco compounds described above.

(2) Volatile organic halogen compound

The organic compounds described in a number of patents issued to Eugene Wainer and others of his staff and represented by the general Formula A—C—$X_3$ wherein each X represents a bromine, chlorine or iodine atom, bromine being particularly preferred, and A represents H, Cl, Br, I, alkyl, haloalkyl, aryl, aralkyl, aroyl or other similar monovalent substituents may be used in the photosensitive compositions of the present invention. As described in United States Patent 3,121,632, for example, these compounds appear to activate a color change in the leuco compound as a result of exposure to light.

Preferred compounds are those which are sufficiently volatile as to permit their removal from the film, after exposure, by means of gentle heating, so as to render the film insensitive to further exposure, thereby fixing the film. A particularly preferred compound is $CBr_4$ but $C_2Br_6$, $C_2HBr_5$, $HCI_3$, $HCBr_3$ and similar compounds are all satisfactory.

The organic halogen compound should be present in between 5 and 500 parts by weight for each part of leuco compound, about 50 parts to 1 part, being a preferred ratio.

(3) Carbonyl compound

The third constituent of the composition of this invention is an amino derivative of benzophenone such as Michler's ketone, p,p-diaminobenzophenone, p-dimethylaminobenzophenone, N,N'-dimethyl-p,p'-diaminodiphenyl ketone, or similarly substituted naphthyl, anthracyl or heterocyclic analogues of benzophenone.

The ketone should be present in about equal amounts with the leuco compound but as little as 0.5 and as much as 5 parts of ketone per part of leuco compound may be used.

(4) Triaryl group V compound

The compositions of this invention include at least one triaryl compound of Sb, As, Bi or P, a preferred compound being triphenyl stibine.

Preferably there are between 5 and 30 parts of triaryl compound for each part by weight of leuco compound.

(5) Binder

Suitable binders for use in this invention include styrene-acrylonitrile copolymer, polyvinyl chloride, nitrile polymers, polyvinyl alcohols, polyvinyl alcohol copolymers, polyoxymethylenes with an oxygen or a hydroxyl group in the chain and other polymers containing polar groups.

A preferred binder is a styrene-acrylonitrile copolymer dissolved in a suitable solvent such as acetone, methylene chloride, or other low boiling chlorinated hydrocarbons.

The proportions of binder may be varied extensively, between 4 and 20 parts of binder by weight per part of leuco compound by weight being suitable.

(6) A compound which functions as an infrared stabilizer

The sixth constituent of this composition is a compound which allows the infrared step to be performed without fogging of the unexposed areas in the films prepared by this invention. Suitable compounds for this purpose include aromatic acid anhydrides and aliphatic acid anhydrides, including phthalic, maleic, benzoic, succinic, and similar anhydrides. Polymers of such acid anhydride may also be used. One such polymer is the polymer of maleic anhydride with methyl vinyl ether, commercially available as Gantrez.

I have found that aliphatic and aromatic ethers of the non-amino type such as triphenylmethoxymethane also appear to act as stabilizers and give blacker images and greater contrast in shorter exposure time.

Preparation

Compositions of this invention should be prepared from pure starting materials. Commercially available materials may be further purified if necessary. In preparing the photosensitive compositions the triaryl group V compounds should be added first. For many compositions preparation under a yellow bug light will suffice. For others it is necessary to prepare the composition under a photographic safelight or in total darkness if the composition is sufficiently sensitive. In the examples which follow the method of preparation will be further illustrated.

After it is prepared the composition is put on paper or on a polar base such as cellulose acetate, polyvinyl alcohol, gelatin, etc. The composition is then dried for between 2 minutes and 10 minutes in air and may be kept under refrigeration or in a closed container to prevent loss of the volatile organic halogen component from the compositions of this invention.

To use the composition it is exposed, photographically, to radiation from a tungsten lamp or an ultraviolet lamp or a 500-watt photoflood at a distance of about 12 inches (lamp to film). The time required to achieve a latent image, which can be developed to full density when exposed to a photoflood lamp at 12 inches varies from 0.1 to 1.0 second depending on the composition used.

The resulting latent image is rendered visible by exposure for between 3 and 30 seconds to radiation between 6000 A. and 15,000 A. provided, for example, from an infrared lamp. The resulting exposed and developed print is rendered fixed by heating from 3 to 5 minutes in a forced draft oven at about 100–150° C. The resulting print is stable to ordinary room light (daylight).

In some cases the infrared development step is unecessary due to the ability of some of the leuco compounds used in this invention to give a direct printout image on short exposure to visible radiation.

The following table illustrates suitable proportions of the various constituents in parts by weight for each part by weight of the leuco compound.

TABLE I.—Composition Ranges

| Constituent: | Parts by wt., per part of leuco compound |
|---|---|
| Leuco compound | 1 |
| Volatile organic halogen compound | 5–500 |
| Carbonyl compound | 0.5–5 |
| Triaryl group V compound | 5–30 |
| Binder | 4–20 |
| Infrared stabilizer | 0.5–10 |

The following examples are illustrative of a preferred mode of practicing the invention and are not intended as limitative thereof.

Example 1

Five hundred milligrams of carbon tetrabromide were dissolved in 5 cc. of a 5% solution of the copolymer of styreneacrylonitrile (Tyril 767, Dow) in acetone containing 10 mg. of 3,6-bis-(dimethylamino)-9-(p-dimethylamino)phenyl xanthene, 10 mg. of Michler's ketone, 100 mg. of triphenylstibine, and 5 mg. of the copolymer of vinyl methyl ether maleic anhydride (Gantrez, General Aniline film). The mixture was coated on baryta photographic paper which has a polyvinyl alcohol coating on the surface, and dried. Exposure of the coating to a 35 mm. projector for three seconds gave a red image. The entire coating was heated at 100° C. for two minutes for fixing. A completely fixed print resulted.

Example 2

Five hundred milligrams of carbon tetrabromide were dissolved in 5 cc. of a 5% solution of the copolymer of styreneacrylonitrile (Tyril 767, Dow) in acetone containing 10 mg. of 2,7-bis(dimethylamino)10-p-dimethylaminophenyl-9,10-dihydro-9,9 - dimethyl anthracene, 10 mg. of Michler's ketone, 100 mg. of triphenylstibine, and 5 mg. of the copolymer of vinylmethyl ether maleic anhydride (Gantrez, General Aniline film). The mixture was coated on baryta photographic paper which has a polyvinyl alcohol coating on the surface, and dried. Exposure of the coating to a 35 mm. projector for ten seconds gave a blue image. The entire coating was heated at 100° C. for two minutes for fixing. A completely fixed print resulted.

Example 3

Five hundred milligrams of carbon tetrabromide were dissolved in 5 cc. of a 5% solution of the copolymer of styrene-acrylonitrile (Tyril 767, Dow) in acetone containing 10 mg. of leuco crystal violet, 10 mg. of Michler's ketone, 100 mg. of triphenylstibine and 5 mg. of the copolymer of vinyl methyl ether maleic anhydride (Gantrez, General Aniline film). The mixture was coated on baryta photographic paper which has a polyvinyl alcohol coating on the surface, and dried. Exposure of the coating to a 35 mm. projector for ten seconds gave a slight image. The exposed coating was heated under a General Electric IR lamp at 6" for 2–3 seconds to bring out the blue image. The entire coating was heated at 100° C. for two minutes for fixing. A completely fixed print resulted.

Example 4

Five hundred milligrams of carbon tetrabromide were dissolved in 5 cc. of a 5% solution of the copolymer of styreneacrylonitrile (Tyril 767, Dow) in acetone containing 50 mg. of leuco malachite green, 25 mg. of Michler's ketone, 100 mg. of triphenylstibine, and 5 mg. of the copolymer of vinyl methyl ether maleic anhydride (Gantrez, General Aniline film). The mixture was coated on baryta photographic paper which has a polyvinyl alcohol coating on the surface, and dried. Exposure of the coating to a 35 mm. projector for 60 seconds gave a slight image. The exposed coating was heated under a General Electric IR lamp at 6" for 20 seconds to bring out the green image. The entire coating was heated at 100° C. for two minutes for fixing. A completely fixed print resulted.

Example 5

Five hundred milligrams of carbon tetrabromide were dissolved in 5 cc. of a 5% solution of the copolymer of styrene-acrylonitrile (Tyril 767, Dow) in acetone containing 50 mg. of Leuco Opal Blue, 25 mg. of Michler's ketone, 100 mg. of triphenylstibine and 5 mg. of the copolymer of vinyl methyl ether maleic anhydride (Gantrez, General Aniline film). The mixture was coated on baryta photographic paper which has a polyvinyl alcohol coating on the surface, and dried. Exposure of the coating to a 35 mm. projector for 120 seconds gave a blue image. The entire coating was heated at 100° C. for two minutes for fixing. A completely fixed print resulted.

Examples 6 to 10

Five mg. of each of the following were used in place of the vinyl methyl ether maleic anhydride copolymer in the formulation of Example 3 with similar results:

Example 6—trityl ether
Example 7—sucinic anhydride
Example 8—phthalic anhydride
Example 9—benzoic anhydride
Example 10—maleic anhydride Example 11

In place of the 500 mg. of $CBr_4$ in the formulation of Example 3, 300 mg. of pentabromoethane was used with similar results.

Example 12

In place of the 500 mg. of $CBr_4$ in the formulation of Example 3, 100 mg. of iodoform was used with similar results.

Examples 13 and 14

Results similar to those obtained in Example 6 were obtained when 10 mg. p-dimethylaminobenzophenone were use in place of Michler's ketone and when 10 mg.

of N,N'-dimethyl-p,p'-diaminodiphenyl ketone was used used in place of Michler's ketone.

Example 15

In place of the 50 mg. of Leuco Malachite Green of Example 4, 50 mg. of 4,4'-bis(dimethylamino)triphenylmethoxymethane was used with similar results.

Example 16

In place of the 50 mg. of Leuco Malachite Green of Example 4, 50 mg. of 4,4'-bis-(dimethylamino)triphenylallylmethoxymethane was used with similar results.

Example 17

Same as Example 4 with the addition of 10 mg. of 4,4'-bis-(dimethylamino)triphenylmethoxymethane. Similar results were observed.

Example 18

To demonstrate the use of reflexographic printing using the photosensitive element of this invention, a coating of the composition described in Example 3 was made on light weight baryta paper of about 80 grams per square meter base weight. This coating was placed in contact with a printed image and exposed with a photoflood lamp through the paper backing of the sensitive layer. The image of the printed copy absorbed the radiation and the white unprinted area reflected the light and a white image on a blue background resulted after infrared development. The white image on the blue background can be used as a paper negative for printing a positive image back on to another coating of the Example 3 composition.

I claim:

1. A photosensitive composition consisting essentially of a mixture of at least one of each of the following constituents, dispersed in a suitable binder:

(1) a Leuco compound
(2) a volatile organic halogen compound
(3) an amino substituted aryl ketone
(4) a triaryl compound of a group V element selected from the group consisting of Sb, Bi, As and P
(5) an infrared stabilizer selected from the group consisting of organic acid anhydrides and their polymers and aromatic ethers of the nonamino type.

2. The composition of claim 1 wherein the leuco compound is selected from the group consisting of leuco triarylmethane compounds, leuco xanthenes, leuco anthracenes, leuco thioxanthenes, leuco acridines and leuco diarylmethane compounds.

3. The composition of claim 2 wherein the leuco compound is a leuco anthracene.

4. The composition of claim 3 wherein the leuco anthracene is a bis-dimethylamino-p-dimethylaminophenyl xanthene.

5. The composition of claim 1 wherein the volatile organic halogen compound is a halogen substituted alkane having no more than 1 hydrogen atom and the remaining atoms attached to the carbon atoms are halogen atoms selected from the group consisting of Cl, Br and I.

6. The composition of claim 1 wherein the organic halogen compound is $CBr_4$.

7. The composition of claim 1 wherein the aryl ketone is a benzophenone.

8. The composition of claim 7 wherein the aryl ketone is Michler's ketone.

9. The composition of claim 1 wherein the infrared stabilizer is an organic acid anhydride.

10. The composition of claim 1 wherein the binder is a polymer containing polar groups.

11. The composition of claim 10 wherein the binder is a styrene-acrylonitrile copolymer.

12.The composition of claim 1 as a thin film.

13. The composition of claim 1 dispersed in a clear film-forming plastic binder.

14. The composition of claim 1 as a self-supporting film.

15. The composition of claim 1 on a solid supporting surface.

16. The composition of claim 1 wherein for each part by weight of leuco compound there are between 5 and 500 parts by weight of volatile organic halogen compound; between 0.5 and 5 parts by weight of aryl ketone; between 5 and 30 parts by weight of triaryl Group V compound and between 0.5 and 10 parts by weight of infrared stabilizer.

References Cited

UNITED STATES PATENTS

| | | | |
|---|---|---|---|
| 3,147,117 | 9/1964 | Wainer. | 96—90 XR |
| 3,194,659 | 7/1965 | Baus, et al. | 96—47 XR |
| 3,272,635 | 9/1966 | Sprague et al. | 96—90 |
| 3,322,542 | 5/1967 | Ullman et al. | 96—90 |

NORMAN G. TORCHIN, *Primary Examiner.*

J. R. EVERETT, *Assistant Examiner.*

U.S. Cl. X.R.

96—47